United States Patent [19]

Gibart et al.

[11] Patent Number: 5,495,588
[45] Date of Patent: Feb. 27, 1996

[54] PROGRAMMABLE CONTROLLER HAVING JOINED RELAY LANGUAGE PROCESSOR AND GENERAL PURPOSE PROCESSOR

[75] Inventors: Anthony G. Gibart, New Berlin; Kurt Knull, Waukesha, both of Wis.

[73] Assignee: Allen-Bradley Company, Inc., Milwaukee, Wis.

[21] Appl. No.: 365,979

[22] Filed: Dec. 28, 1994

Related U.S. Application Data

[63] Continuation of Ser. No. 154,232, Nov. 18, 1993, abandoned.

[51] Int. Cl.[6] .................................................. G06F 9/455
[52] U.S. Cl. ..................... 395/375; 395/500; 364/DIG. 1
[58] Field of Search .................................. 395/375, 775, 395/800, 500

[56] References Cited

U.S. PATENT DOCUMENTS

| | | | |
|---|---|---|---|
| 3,997,895 | 12/1976 | Cassonnet et al. | 395/500 |
| 4,716,526 | 12/1987 | Mori et al. | 395/800 |
| 4,758,978 | 7/1988 | Cruess et al. | 395/375 |
| 4,870,614 | 9/1989 | Quatse | 395/375 |
| 4,888,680 | 12/1989 | Sander et al. | 395/500 |
| 4,949,241 | 8/1990 | Iwasaki et al. | 395/290 |
| 5,027,271 | 6/1991 | Curley et al. | 395/728 |
| 5,062,041 | 10/1991 | Zuk | 395/375 |
| 5,088,033 | 2/1992 | Binkley et al. | 395/500 |
| 5,093,908 | 3/1992 | Beacom et al. | 395/375 |
| 5,155,855 | 10/1992 | Masuo et al. | 395/479 |

*Primary Examiner*—Robert B. Harrell
*Assistant Examiner*—Viet Vu
*Attorney, Agent, or Firm*—Keith M. Baxter; John M. Miller; John J. Horn

[57] ABSTRACT

A programmable controller for executing general instructions and relay ladder instructions employs a general purpose microprocessor together with a high speed relay ladder processor. The relay ladder instruction in a user program are executed by the special processor exclusively. When a general instruction is encountered, the special processor releases the general purpose microprocessor from a wait state and provides it with data in response to a previous long read instruction. This data is interpreted by the microprocessor to indicate the next instruction to be executed and points to a series of machine instructions terminating in another long read instruction to a designated address. When a read of this designated address is detected by the special processor, thus indicating the conclusion of the execution of the general instruction, the special processor puts the microprocessor back in the wait state and continues to execute relay ladder instructions in the user program if any. The allocation technique may be used with a large class of general purpose microprocessors with no modification and without the need for separate allocation circuitry.

8 Claims, 2 Drawing Sheets

PROGRAMMABLE CONTROLLER HAVING JOINED RELAY LANGUAGE PROCESSOR AND GENERAL PURPOSE PROCESSOR

This is a continuation of application Ser. No. 08/154,232, filed Nov. 18, 1993, now abandoned.

FIELD OF THE INVENTION

This invention relates to programmable controllers for use in controlling industrial processes and in particular to a programmable controller employing both a general purpose microprocessor and a special purpose relay language processor

BACKGROUND OF THE INVENTION

Programmable controllers are specialized computers used for controlling an industrial process, such as an assembly line, in accordance with a stored program. Under the direction of the stored program, the programmable controller examines a series of inputs, reflecting the status of the industrial process, and changes a series of outputs, controlling the industrial process.

Programmable controllers are typically programmed in a "relay ladder" language. This language, which has become an accepted standard in industry, employs instructions represented by "contacts" and "coils" of virtual relays connected arranged in ladder-like "rungs". A relatively small number of basic ladder logic instructions provide a complete set of Boolean "primitives" from which complex control programs may be crafted. The core instructions include XIC contacts ("Examine If Closed"), XIO contacts ("Examine If Open"), and OTE coils ("Output Enable"). The former two instructions check the state of a binary input and are graphically represented by either normally open or normally closed contacts in the relay ladder diagram. The latter instruction identifies the state of an output and is graphically represented by a coil. Other "coil" instructions include the OTL coil ("Output Latch") and OTU coil ("Output Unlatch").

Over the years, special purpose instructions that permit: counting, timing, simple mathematics (including comparisons of numbers, addition and subtraction) and basic Boolean manipulation have augmented these basic relay ladder logic instructions. These commonly used instructions together with the more basic instructions described initially will henceforth be collectively termed "relay ladder instructions" reflecting their common usage and heritage.

With increasing overlap between the technologies of programmable controllers and conventional computers, a demand for programmable controllers that recognize traditional computer-like instructions has arisen. Accordingly, present day programmable controllers are also capable of implementing a variety of non-traditional instructions, other than relay ladder instructions, that permit more complex mathematical manipulation, such as multiplication, division, and taking a square root, as well as basic machine language instructions such as shift left and right, jumping (to subroutines) and those implementing communication protocols. These additional instructions will henceforth be referred to as "general instructions".

The availability of regularly succeeding generations of increasingly powerful yet inexpensive general purpose microprocessors, has made it desirable to construct a programmable controller using an off-the-shelf microprocessor to execute traditional relay logic instructions. In such a microprocessor based machine, each relay language instruction is interpreted or compiled to the native machine language of the microprocessor prior to execution on that microprocessor. A given relay language instruction may be realized as multiple machine instructions. These compiled or interpreted instructions will be termed "micro-instructions" to distinguish them from the source relay ladder instructions from which they were derived.

Although this use of microprocessors can significantly reduce the cost of a programmable controller, it normally comes at the cost of reduced performance. The need to execute multiple micro-instructions for each relay language instruction interposes delay in the execution of the overall program. This may detrimentally affect the ability of the programmable controller to execute complex tasks with more inputs and outputs and yet to maintain near real-time control.

SUMMARY OF THE INVENTION

The present invention provides a method of integrating a special-purpose, high-speed processor, for relay language instructions with an off-the-shelf microprocessor for general instructions. Importantly, the two processors are coordinated through the use of information passed on the conventional address and data lines of the microprocessor during a "long read" type instruction common to instruction sets of commercially available microprocessors. Thus, no modification of the microprocessor is required, and the possibility of future microprocessors having improved cost performance being compatible with the architecture is preserved.

Generally, upon completion of any general instruction by the general purpose microprocessor, the microprocessor executes a long read instruction. This instruction reads a designated address in memory to determine the next address at which an instruction should be executed. The attempted reading of the designated address is detected by the special processor that then places the general purpose microprocessor in a "wait" state. The special processor fetches the next instructions and, as long as they are relay language instructions, executes them. When a general purpose instruction is encountered, the special processor releases the general microprocessor from the "wait" state but only after placing the address of a routine, needed by the microprocessor to execute the general instruction, on the microprocessor's data lines. The microprocessor receives this routine address, apparently in response to its previous long read request, and being released from the "wait" state continues to execute the routine as directed by the special processor. At the end of every routine implementing a general instruction, there is a long read instruction so that the special processor may regain control of the programmable controller.

More specifically, the method involved executing a general instruction by the microprocessor as a series of at least one micro-instruction, the series terminating in a micro-instruction that causes the microprocessor to read the contents of a designated address of memory and jump to an address indicated by the contents of the designated address. The address lines of the microprocessor are monitored by the special processor to detect an attempted reading of the designated address. Upon such a reading, the processor puts the microprocessor into a "wait" state. At this time, the special processor continues to execute instructions until another general instruction is encountered. Upon receipt of a general instruction, the processor releases the microprocessor from the "wait" state and provides the address of a first micro-instruction of the encountered general instruction to the microprocessor.

It is thus one object of the invention to permit a special processor to share execution of instructions with a general purpose microprocessor without modification of the general purpose microprocessor. The allocation of the program requires only communication via normal address and data lines, the wait control line (available in most microprocessors), and the ability of the microprocessor to do a long read.

It is another object of the invention to eliminate the complex hardware and additional overhead necessary to divide a program among two processors. The specialty processor during execution of the typically predominant relay language instructions retains control of the programmable controller essentially eliminating any overhead. Only for the slower and less frequent general instructions is control transferred. Detection of the instruction type, which must be done at each fetch/execute cycle, may be accomplished rapidly by a simple test of a bit field of each instruction indicating its type.

The special processor may also activate the microprocessor upon detection of an interrupt. In this case, the processor releases the microprocessor from the "wait" state and places on the data bus the address of a first micro-instruction of a sequence of at least micro-instruction performing no operation ("NOPs") and terminating in a long read. During executing the NOPs, the microprocessor services the interrupt according to normal conventions and then returns to execute a long read terminating the NOP string.

Thus, it is another object of the invention to utilize the microprocessor's interrupt handling capability regardless of which processor is executing an instruction.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Controller Hardware

Figure 1:
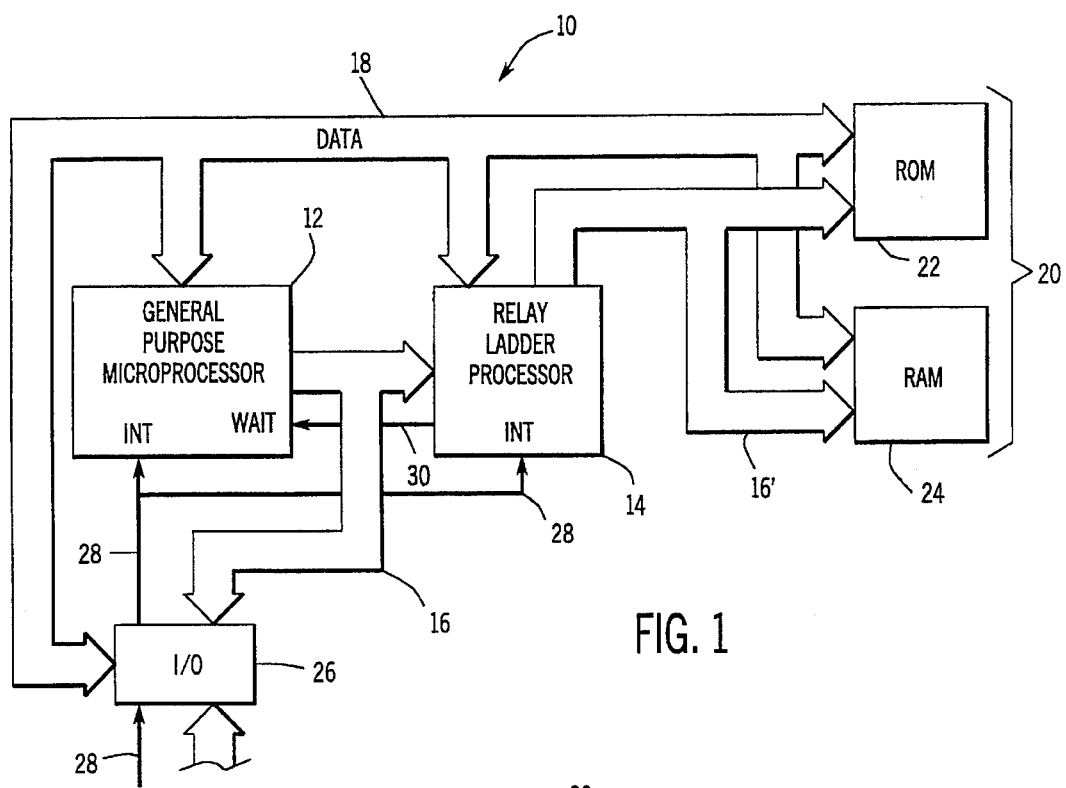
FIG. 1 is a simplified block diagram of the architecture of a programmable controller according to the present invention showing the sharing of address and data lines, and memory between the general purpose microprocessor and the special purpose relay ladder processor.

Referring to FIG. 1, a programmable controller 10 of the present invention employs a general purpose microprocessor 12 such as a Motorola 68EC020 as is commercially available from Motorola Inc. of Austin, Tex. and special purpose relay language processor 14 optimized for the processing of relay ladder instructions. The relay ladder processor in the preferred embodiment is a custom integrated circuit having a limited instruction set rapidly executed in hardware. Hardware execution of relay ladder logic, such as was used in the earliest programmable controllers, is well understood in the art.

Generally, the relay ladder processor 14 may be any other processor optimized for a subset of the instructions to be executed. For brevity, the general purpose microprocessor 12 will henceforth be termed the microprocessor and the relay ladder processor 14 will be termed the special processor.

The microprocessor 12 and special processor 14 share a data bus 18 communicating with conventional computer memory 20 made up of read only memory 22 "ROM" and random access memory 24 "RAM" to receive words of data on the data bus 18 in response to an address placed on an address bus 16' by the special processor 14. The range of addresses defines an address space including but not limited to the addresses of the memory 20.

The ROM 22 generally holds routines of micro-instructions to be executed by the microprocessor 12 in implementing a general instruction in a user program, the latter which is held in RAM 24. The ROM 22 also holds an instruction vector table ("IVT") to be described.

The microprocessor 12 connects with address bus 16 which is connected to I/O circuitry 26 and special processor 14, the latter which may pass addresses from address bus 16 to address bus 16' if control has been passed to the microprocessor 14 as will be described.

The address bus 16 and data bus 18 provide for communication to I/O circuitry 26 which thus is "mapped" to memory as is well understood in the art so that inputs and outputs may be read or changed in the same manner that memory is read or changed. The I/O circuitry 26 serves to communicate the various inputs and outputs between the controlled process and the microprocessor.

I/O circuitry 26 also provides a path for a hardware interrupt signal along interrupt line 28 which is provided both to the microprocessor 12 and the special processor 14. Following conventional microprocessor design, the interrupt line 28, when enabled, causes the microprocessor 12 to suspend operation and to jump to an interrupt service routine which is immediately executed. At completion of the interrupt service routine, the microprocessor returns to the interrupted task.

The programmable controller 10 also includes various control lines well known in the art and not shown for clarity in FIG. 1 except for a "wait" state line 30 originating at the special processor 14 and being received by a "wait" input on the microprocessor 12. When enabled, the wait state line 30 causes the microprocessor 12 to suspend operation for as long as the wait line is enabled.

Figure 2:
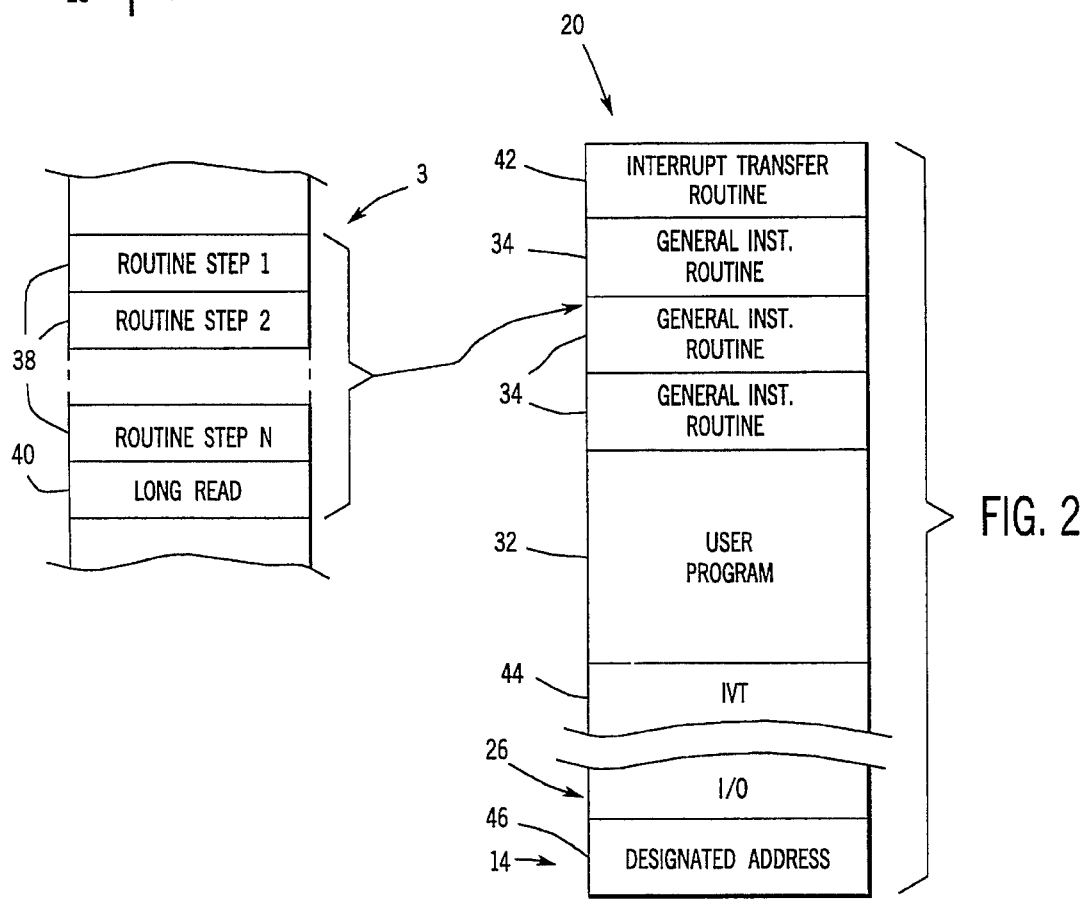
FIG. 2 is a detailed view of the address space of the memory of FIG. 1 showing separation of the memory into a user program, an instruction vector table ("IVT"), general instructions routines, and of the address space of I/O circuitry and showing a special designated address decoded by the special processor.

Referring now to FIG. 2, memory 20 composed of both ROM 22 and RAM 24 holds a user program 32 consisting of relay ladder instructions and general purpose instructions. As described above, the relay ladder instructions are a subset of the instructions of the user program selected to represent commonly used control instructions that may be rapidly executed by hardware in the special processor 14. For this reason, as will be described further below, relay ladder instructions in the user program 32 are executed directly by the special processor 14.

The general purpose instructions in the user program 13 are executed by the microprocessor 12 through general instruction routines 34 which consist of one or more microinstructions in the native language of the microprocessor 12 that together implement the desired general instruction. Each general instruction routine 34 thus consists of a number of routine steps 38, each being one micro-instruction, followed by a long read micro-instruction 40.

A long read instruction is any instruction which reads a given memory address and loads the contents of that address into the instruction pointer of the microprocessor 12 to indicate the address of the next instruction to be executed. Thus, a long read instruction reads data at a given address and uses that data as an address of the next instruction. Long read instructions include long branch instructions using indirect addressing, such as are well known in the art and implemented in many common microprocessors. As will be described below, the use of a long read instruction 40 to a particular designated address signals transfer of control from the microprocessor 12 to the special processor 14.

Also contained in memory 20 is an interrupt transfer routine 42 and an instruction vector table 44 ("IVT") as will both be described.

Finally, within the address space of memory 20, but not a part of memory 20, is the I/O circuitry 26 and a designated address 46 which is decoded by the special processor 14 as will be described.

It will be understood that the precise ordering of the above elements within the address space is arbitrary and that FIG. 2 serves principally to itemize the different elements contained in the address space.

Operation of the Microprocessor

Referring to FIGS. 1 and 2, during normal operation of the programmable controller 10, the microprocessor 12 may execute a general instruction of the user program 32 by performing one of the routine steps 38 of the general instruction routine 34. At the completion of the general instruction routine 34, the microprocessor 12 executes a long read to the designated address 46. In the preferred embodiment, the designated address is hexidecimal value C0 0000 being easily decoded and located out of the way toward the top of address space. The particular designated address, however, is arbitrary and any designated address or multiple designated addresses may be used.

The special processor 14 monitors the address bus 16 to detect the designated address 46 and is internally programmed to respond to that designated address to enable the wait state line 30 to the microprocessor 12. This places the microprocessor 12 in a wait state where its operations are suspended. At the time of suspension, the microprocessor 12 having put the designated address 46 on the address bus 16 is awaiting data from that address.

The designated address 46 does not exist in memory 20 but rather is decoded by the special processor 14 which will return data to the microprocessor 12 at the conclusion of the wait state. Specifically, at the conclusion of the wait state, the microprocessor 12 receives data from the special processor 14 which points to the first routine step 38 of a general instruction routine 34 to be executed by the microprocessor 12. The microprocessor executes this general instruction routine 34 and at its conclusion again executes a long read instruction 40 to the designated address 46. This causes the microprocessor 12 to again be placed in a wait state by the special processor 14.

Thus the microprocessor 12 simply executes a sequence of general instruction routines 34 receiving the address of each next general instruction routine from the special processor 14 through the agency of a long read.

Operation of the Special Processor

Figure 3:
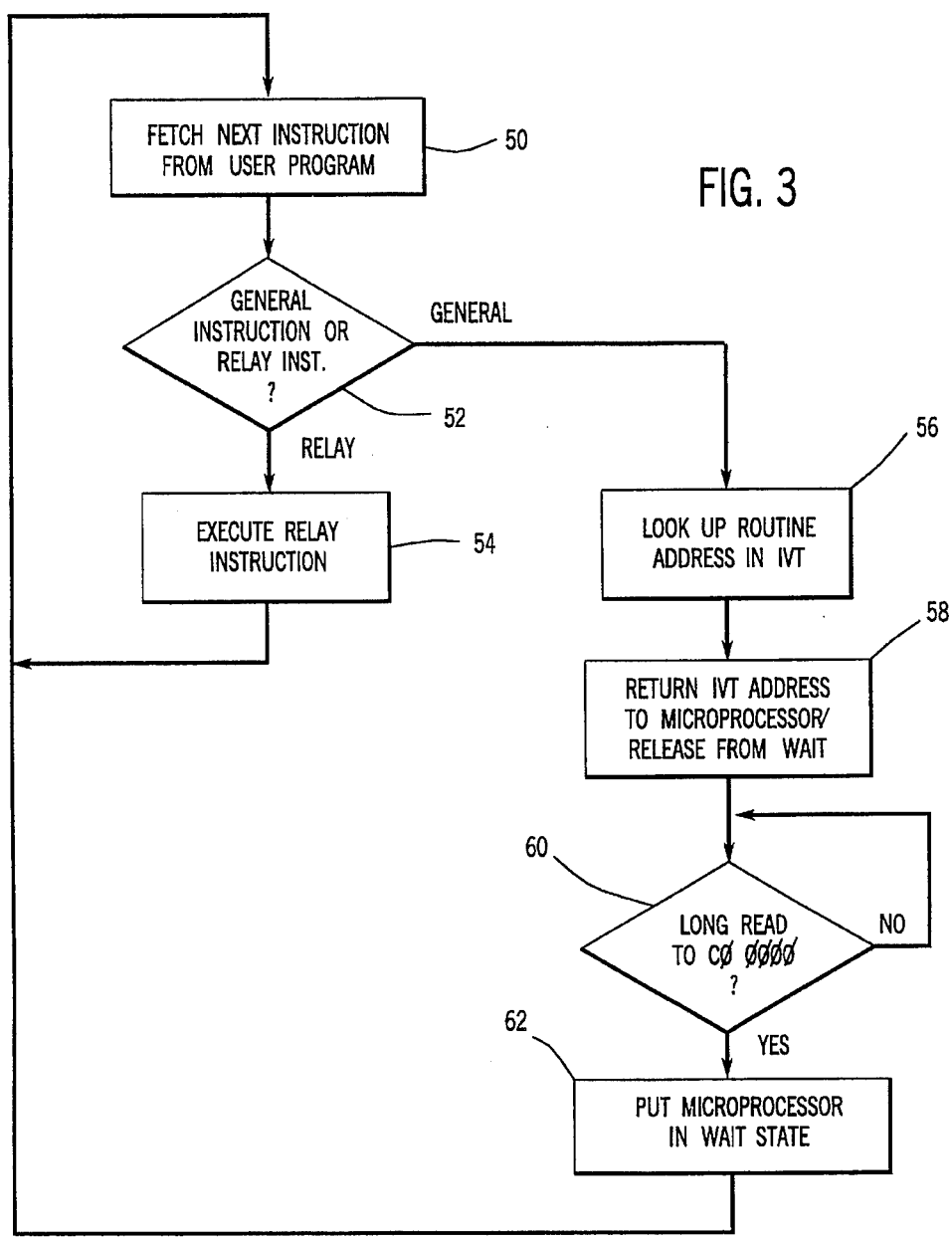
FIG. 3 is a flow chart of the steps performed by the special processor of FIG. 1 in allocating the instructions of the user program between itself and the microprocessor.

The special processor 14 is responsible not only for executing relay ladder instructions but for controlling the microprocessor 12 to execute any general instructions. Referring to FIG. 3, the special processor 14 begins operation by fetching an instruction, which may be either a relay ladder instruction or a general instruction, from the user program 32, as indicated by process block 50. The instruction fetched is designated by an instruction pointer (not shown) within the special processor 14 which should be distinguished from the instruction pointer within the microprocessor 12 (also not shown) which is frozen at its value at the time the wait state was activated.

Next, at decision block 52, the instruction is analyzed to see if it is a general instruction or a relay instruction. Decision block 52 distinguishes between general instructions and relay instructions by analyzing a two-bit bit field in each fetched instruction which indicates whether the instruction is a general or relay instruction. This bit testing is extremely fast and may make use of a bit field added to the user program at the time of compilation, for example.

If the fetched instruction is a relay ladder instruction, the instruction is executed by the special processor 14 at process block 54. If a number of relay ladder instructions follow one another, the special processor 14 will simply repeat blocks 50, 52 and 54 in rapid succession. It will be recognized, therefore, that for the execution of relay ladder instruction there is virtually no overhead involved in allocating the user program 32 between the microprocessor 12 and the special processor 14.

Upon encountering a general instruction in the user program 32, the special processor 14 at decision block 52 proceeds to process block 56 where an address for a general instruction routine 34 corresponding to that general instruction is found. Process block 56 decodes the general instruction into an address in the IVT 44 which in turn provides the needed starting address of the general instruction routine 34.

This address of the general instruction routine 34 is then provided to the microprocessor 12 on its data bus 18 at the same time that the wait state line 30 is disabled per process block 58. As described before, the microprocessor 12 receives the address on the data bus 18 as simply a response from its previous long read instruction 40.

The general purpose microprocessor 12 then jumps to the beginning of the general instruction routine 34 indicated by the data from the special processor 14 and begins executing the routine steps 38 of that general instruction routine 34.

In the meantime, at decision block 60, the special processor 14 continues to monitor the address bus 16 to check for any reading of the designated address 46. If no such address is read on the address bus 16, the program loops at decision block 60 while the microprocessor 12 continues its execution of a general instruction routine.

At the conclusion of the execution of the general instruction routine 34, the microprocessor 12 once again executes a long read to the designated address 46 which is detected at the decision block 60 by the special processor 14 which responds by placing the microprocessor 12 back into the wait state per process block 62.

Referring again to FIG. 1, a similar procedure may be used to respond to an interrupt to the controller 10. Upon receipt of an interrupt signal on interrupt line 28, if the microprocessor 12 is executing a general instruction, the interrupt is simply serviced by the microprocessor according to well-understood procedures. That is, the microprocessor interrupts whatever task it is performing and jumps to a predetermined interrupt service routine in RAM 24 (not shown) to service the interrupt. Servicing the interrupt may be, for example, reading and storing time critical data or updating a counter or the like. Upon completion of service of the interrupt, the microprocessor returns to its previous task.

Figure 4:
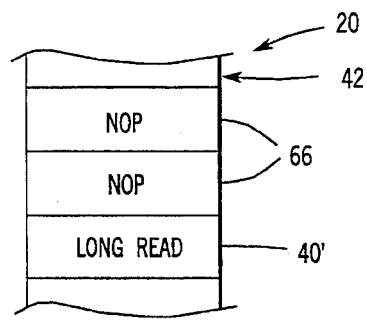
FIG. 4 is a detailed view of a routine used to transfer interrupt handling between a special processor and microprocessor.

Alternatively, if special processor 14 is executing instructions per the loops of process block 50, 52 and 54 and an interrupt occurs, the special processor 14 releases the wait state of the microprocessor 12 while providing on its data bus 18 the initial address of a special interrupt transfer routine 42. Referring to FIG. 4, the interrupt transfer routine 42 is simply one or more NOP micro-instructions 66 followed by a long read 40'. A NOP instruction, available on virtually all microprocessors, performs no operation in the microprocessor but occupies a finite period of execution time. The purpose of the interrupt transfer routine 42 is to provide a short period of operation of the microprocessor 12 during which it may detect and service the interrupt on interrupt line 28. At the conclusion of the service of the interrupt on interrupt line 28, the microprocessor 12 returns to the interrupt transfer routine 42, completing any remaining NOP instructions 66 and then executing the long read 40' to return control to the special processor 14.

Thus, the present invention provides a means of connecting special processor 14 to a general purpose microprocessor using only the control, address, and data lines typically available in such microprocessors together with a commonly available long read type instruction.

The above description has been that of a preferred embodiment of the present invention. It will occur to those who practice the art that many modifications may be made without departing from the spirit and scope of the invention. In order to apprise the public of the various embodiments that may fall within the scope of the invention, the following claims are made.

We claim:

1. A programmable controller for executing a user program having relay ladder instructions and general instructions comprising:

a computer memory storing the user program, the memory holding words at addresses in an address space including at least one predetermined designated address;

A. a general purpose microprocessor:
   (a) providing the computer memory with first addresses via an address bus and receiving words from the computer memory via a data bus,
   (b) responding to the cessation of a wait signal by sequentially executing general instructions as routines of at least one micro-instruction designated by an instruction address in a microprocessor instruction pointer,
   (c) responding to at least one micro-instruction to cause the microprocessor instruction pointer to obtain its instruction address from the predetermined designated address of the memory;
   (d) responding to the initiation of the wait signal by suspending the sequential execution of general instructions, B. a special processor:
   (i) monitoring the first addresses of the general processor;
   (ii) initiating the wait signal upon detecting the predetermined designated address on the address bus;
   (iii) providing the computer memory with second addresses via the address bus and receiving words from the computer memory via the data bus,
   (iv) receiving instructions from the user program in the computer memory at addresses identified by an instruction address in a processor instruction pointer,
   (v) executing the instructions only if they are relay ladder instructions,
   (vi) if an instruction is not a relay ladder instruction, ceasing the wait signal and providing the microprocessor with a word on the data bus so that the word is received by the microprocessor instruction pointer as its instruction address for the microprocessor to begin execution of the instruction that is not the relay ladder instruction.

2. The programmable controller of claim 1 wherein step (iv) occurs when receiving a general instruction from the user program.

3. The programmable controller of claim 1 wherein the word provided by the processor in step (v) is an address of the first micro-instruction of a routine of the general instruction.

4. The programmable controller of claim 1 wherein all general instructions have a single unique bit pattern that is recognized by the processor.

5. The programmable controller of claim 1 wherein the microprocessor and the processor may receive an interrupt signal and wherein step (iv) occurs when receiving the interrupt signal.

6. A method of executing a user program, having relay ladder instructions and general instructions, in a programmable controller having: a computer memory storing the user program, the memory having a plurality of words at addresses in an address space including at least one predetermined designated address, a general purpose microprocessor executing the general instructions and having address lines for identifying addresses of the computer memory to be read by the microprocessor, a special purpose processor executing the relay ladder instructions, the method comprising the steps of:

(a) executing a general instruction with the microprocessor as a sequence of at least one micro-instruction, the sequence terminating, upon the occurrence of a relay ladder instruction, in a micro-instruction that causes the microprocessor to read the predetermined designated address and obtain its next instruction at an address read from the predetermined address;

(b) monitoring the address lines of the microprocessor with the special purpose processor to detect an attempted reading of the predetermined designated address by the microprocessor;

(c) putting the microprocessor into a wait state, prior to the microprocessor obtaining the next address, upon the attempted reading of step (b);

(d) executing the relay ladder instruction of the user program with the special processor, and subsequent relay ladder instructions until a general instruction is encountered;

(e) releasing the microprocessor from the wait state upon receipt of the general instruction and providing the microprocessor with the address of a first micro-instruction of the general instruction to the microprocessor in response to the attempted reading of step (b).

7. The programmable controller of claim 6 wherein step (d) determines if a general instruction has been received by testing each instruction for a unique, single bit pattern.

8. A method of executing a user program, having relay ladder instructions and general instructions, in a programmable controller having: a computer memory storing the user program, the memory having a plurality of words at addresses in an address space including at least one predetermined designated address, a general purpose microprocessor executing the general instructions and detecting and servicing the interrupts and having address lines for identifying addresses of the computer memory to be read by the microprocessor, a special purpose processor executing the relay ladder instructions and detecting interrupts, the method comprising the steps of:

(a) executing a general instruction with the microprocessor as a sequence of at least one micro-instruction the sequence terminating, upon the occurrence of a relay ladder instruction, in a micro-instruction that causes the microprocessor to read the predetermined designated address and obtain its next instruction at an address read from the predetermined address;

(b) monitoring the address lines of the microprocessor with the special purpose processor to detect an attempted reading of the predetermined designated address by the microprocessor;

(c) putting the microprocessor into a wait state, prior to the microprocessor obtaining the next address, upon the attempted reading of step (b);

(d) executing the relay ladder instructions with the special processor until a general instruction is received;

(e) releasing the microprocessor from the wait state upon receipt of the general instruction and providing the address of the first micro-instruction of a sequence of at least one micro-instruction performing no operation, the sequence terminating in a micro-instruction that causes the microprocessor to read the contents of the predetermined designated address of the memory and jump to an address indicated by the words of the predetermined designated address, in response to the attempted reading of step (b).

* * * * *